July 3, 1928.
C. L. REYNOLDS
1,675,958
TRANSIT CONCRETE MIXER DRIVE MEANS
Filed Aug. 15, 1927    2 Sheets-Sheet 1
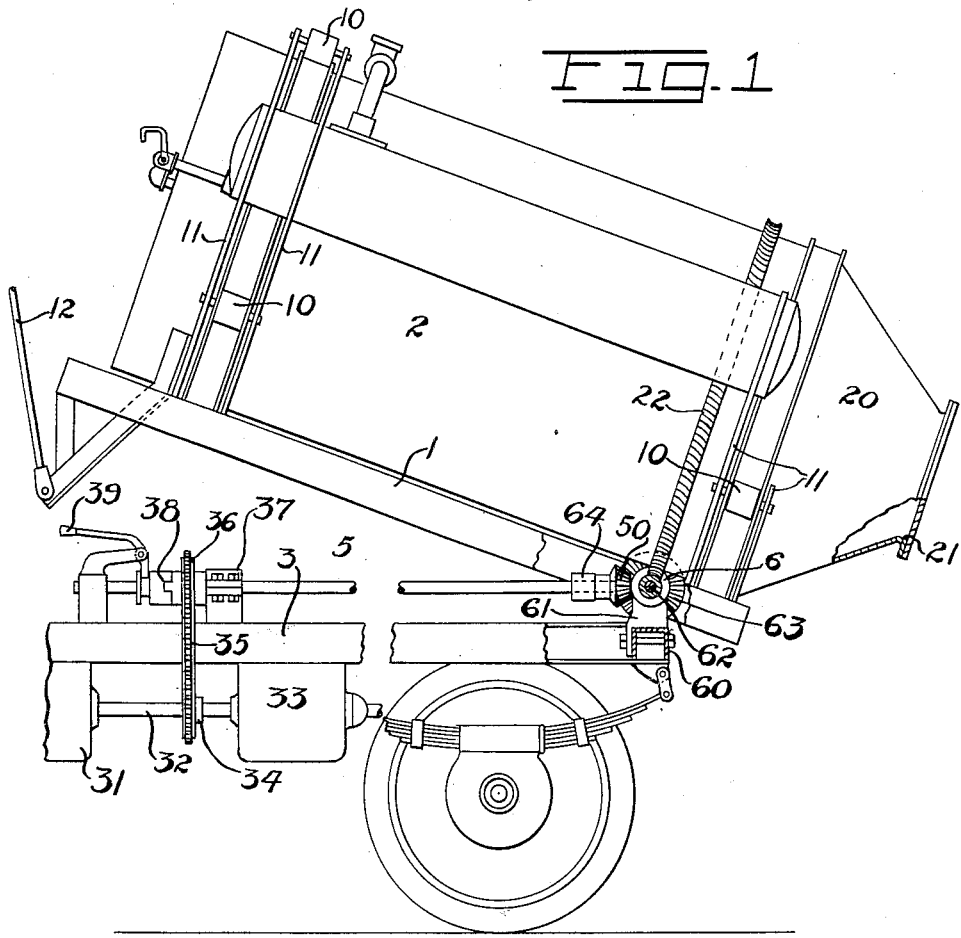
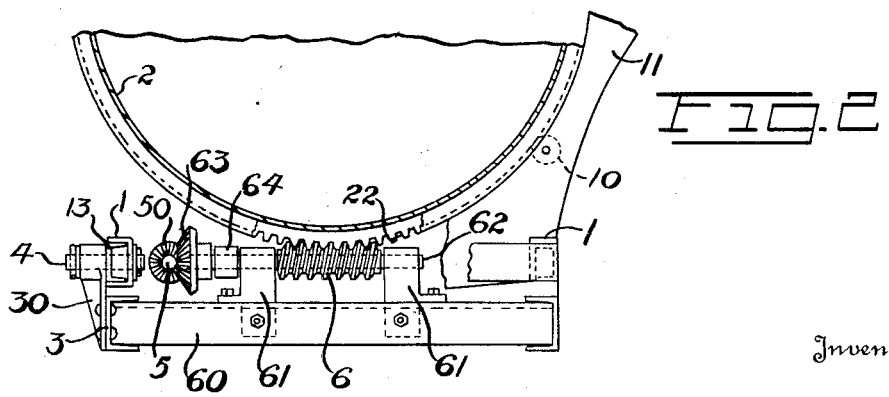
Inventor
By Charles L. Reynolds
Attorney

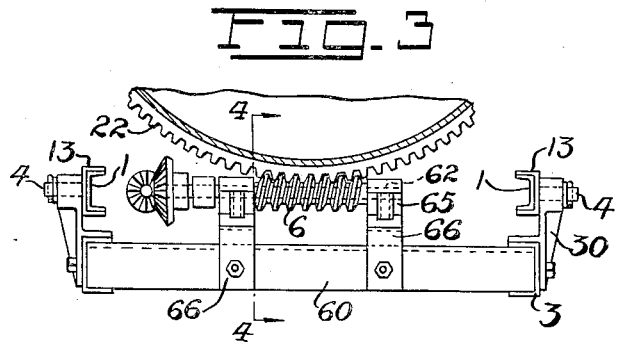
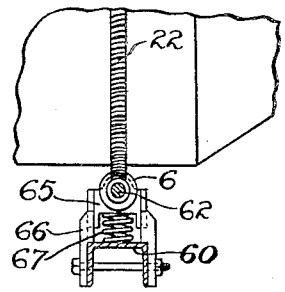
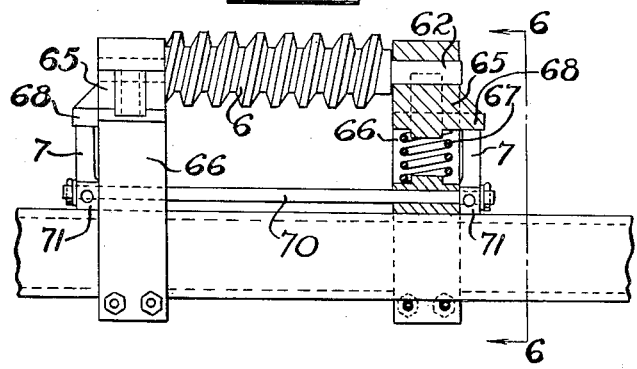
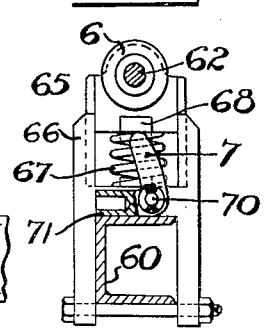

Patented July 3, 1928.

1,675,958

UNITED STATES PATENT OFFICE.

CHARLES L. REYNOLDS, OF SEATTLE, WASHINGTON.

TRANSIT CONCRETE-MIXER DRIVE MEANS.

Application filed August 15, 1927. Serial No. 213,095.

My invention relates to a drive arrangement for concrete or mortar mixers, particularly to such as are shown in my Patent No. 1,636,926.

In that patent the power transmission between the truck, motor and the mixer drum includes a transverse sleeve which is intimately associated with a transverse pivot rod, that is to say, the sleeve which transmits power is journaled about the pivot rod so that it is maintained coaxial therewith. Such trucks of necessity must frequently pass over ground which is more or less uneven, and as the current practice in truck design requires that the frames be flexible and yielding under such conditions, this yielding or weaving places heavy stresses on the transverse pivot pin through the agency of the power transmission sleeve. Especially is this true if this sleeve includes a worm drive pinion, for then a large portion of the weight of the load within the mixer drum may at times be placed on this drive pinion and transverse pivot rod. Furthermore, such repeated stresses will tend to bend the pivot rod where it enters the sleeve, or to crystallize it at these points, causing it to break. If the rod bends it will bind in the sleeve, preventing its free rotation, and ultimately defeating the main purpose of that invention, which is to maintain this transverse sleeve, or power transmission member, always coaxial with the pivot axis.

Accordingly, it is the chief object of the present invention so to divorce the transverse power transmission shaft from the pivot means of the subframe on the chassis, while yet maintaining the two coaxial to obtain the benefits obtained through the invention disclosed in my previous patent, that the truck chassis and the subframe mounted thereon are substantially free to weave and give in various directions without placing undue stresses on either the pivot means or the power transmission means.

While I prefer that the construction which I will hereafter describe be more or less rigid so that it may be maintained substantially in exact alignment with the pivot axis at all times, yet under certain conditions it may be desirable to permit a limited amount of yielding in excess of what would be permitted by a rigid mounting, and to that end it is an object to provide a means whereby the transverse power transmission member may, if the occasion requires, be permitted to yield under stresses greater than would be permitted by a rigid mounting, and it is a further object, when this type of connection is used, to provide means whereby the power transmission means may be brought into more or less exact axial alignment with the pivot means, for purposes of dumping, or of rotating the mixer element while in dumping position.

My invention comprises the novel parts and the novel combination and arrangement thereof, as shown in the accompanying drawings, described in the specification, and more particularly defined by the claims terminating the same.

In the accompanying drawings I have shown my invention embodied in various forms, representing a preferred form and modifications thereof.

Figure 1 is a side elevation of the chassis and of the truck and mixer mounted thereon, illustrating the connection between the mixer element and the power plant of the truck.

Figure 2 is a section on line 2—2 of Figure 1.

Figure 3 is a view similar to Figure 2, showing a modification, and Figure 4 is a view thereof on line 4—4 of Figure 3.

Figure 5 is a view similar to Figure 3 of a further modification, and Figure 6 is a section thereof on line 6—6 of Figure 5.

In order that my invention may be understood, I will describe it in association with a mixer of the type shown in my previous patent referred to above, although it will be understood that as it relates to a drive or power transmission means, the form of the mixer element is of no importance to my present invention, nor, for the same reason, is the type of power source or the manner in which the subframe is secured to the chassis of importance, except that the subframe and chassis must be connected by some pivotal means.

Thus the subframe 1, as shown, carries a suitable mixer element, represented herein by the rotary drum 2, this drum being cradled on rollers 10 mounted in stanchions 11 on the subframe 1, or being otherwise suitably supported for rotation on the subframe, and being so supported that the subframe may be tilted for dumping through the aperture 20 in the coned end 20 of the mixer. The mixer is revoluble while in dumping position, or in position of rest, or in any intermediate position. Movement into dumping position is effected in any suitable manner, and I have herein shown a cable 12 which may be connected to any suitable vertical hoist (not shown) in a manner common in the dump truck art.

The chassis 3 of the truck supports the subframe 1 through a pivot connection which may be of any type found suitable in the dump truck art, and which, as shown, comprises two spaced pivot pins 4. Thus the chassis 3 may be provided with a bracket 30, and the subframe 1 may be provided with a corresponding bracket 13, the pins 4 passing through the brackets 30 and 13 to secure the chassis pivotally upon the subframe.

The pivotal mounting described is illustrative only, and any pivotal mounting may be employed which is found suitable. It is only necessary to point out that the inner ends of the pins 4 must be spaced one from the other.

Upon the chassis 3 is mounted the usual power plant, of which I have illustrated the rear end only at 31. This may represent a portion of the engine proper from which a drive shaft 32 extends to a gear box 33. Preferably, this shaft 32 is not directly connected to the engine shaft, but is connected through a suitable clutch mechanism, not shown. Thus by a sprocket wheel 34 upon the shaft 32, connected by a chain 35 with a sprocket wheel 36 carried upon a shaft 5 upon the chassis, this shaft 5 may be turned at will from the truck power plant. The shaft 5 preferably is journaled at 37 on the chassis near its forward end, but need not be journaled on the chassis near its rear end. Complemental clutch members 38, controlled by a lever 39, control the driving of the sprocket wheel 36, and consequent revolution of the shaft 5, from a point convenient to the driver.

The mixer element or drum 2 may be provided with various means for effecting its revolution. Thus, while I have shown a large worm gear 22 encircling its rear end in the plane of the pivot axis defined by the pins 4, this may be replaced by various other forms of gear, chain or friction drives, as more particularly shown in my patent referred to above. However, as my present invention is particularly effective when used in conjunction with a direct worm gear drive, I have illustrated that type of drive. Thus a transverse worm pinion 6 meshes directly with the large worm gear 22. The axis of this gear 6 is arranged in the line of the pivot axis defined by the pins 4, or their equivalents. The pinion 6, however, lies between the inner ends of the pins 4. It may be supported in a variety of ways, and as shown herein, I have provided the chassis 3 with a cross member 60, and have secured thereon, between the side members of the chassis, the bearings 61. The extensions 62, or the shaft on which the pinion 6 is secured, are received in these bearings 61, and at one end the shaft 62 is extended for the reception of a bevel gear 63 or like member, meshing with a gear 50 on the shaft 5.

By this means the mixer drum 2 is directly connected with the power plant 31 of the truck through a transverse rotary member 6 which is coaxial with the pivot axis of the pins 4, but wholly independent thereof. The bearings 61 being close together, this permits weaving of one side of the chassis and subframe relative to the other side without greatly affecting the shaft 62 or causing stresses between this and the pivot axis, for this shaft is wholly independent of the pins 4. It will be evident that if the shaft 5 is not supported from the chassis, at its rear end, it must be linked to the shaft 62 to keep the gears 50 and 63 in mesh, and to that end I may provide a connecting link or bracket 64, or this end of the shaft may be supported from the cross piece 60.

At times, as noted above, it may be desirable to permit even greater yielding than is permitted by the rigid journals in the bearings 61. Thus, as seen in Figures 3 to 6, inclusive, the shaft 61 is not directly journaled in a bearing secured to the cross piece 60, but is received in blocks 65, which, in turn, are guided for vertical movement in frames 66, which are rigidly secured to the cross piece 60. In order to maintain the worm pinion 6 in engagement with the worm gear 22, a stiff spring 67 may be employed beneath each journal block 65. It is the function of these springs 67 to maintain the gears 6 and 22 in engagement, and to maintain the axis of the shaft 62 substantially in alignment with the pivot pins 4. They are not intended to support the load of the shell 2, for this is carried upon the rollers 10, supported from the subframe.

It will be evident that when the drum 2 is horizontal, it will not be difficult to maintain the shaft 62 and pins 4 in alignment, and the drive may be made through the arrangement described, with ease. However, when the drum is tilted towards dumping position, the rod will shift back and create a tendency to depress the shaft 62 and worm 6, and while some deviation from exact alignment will not adversely affect the operation of the drive, and while the spring 67 might be made stiff enough to resist this tendency sufficiently and to keep the shaft 62 in approximate alignment with the pivot pins 4, it may not be desirable to employ so stiff a spring. Therefore, to resist the tendency to depress the pinion at such times, I may provide positive means, as shown in Figures 5 and 6, for preventing depression of the pinion.

Thus the springs 67 are provided as before to maintain the pinion 6 in substantial axial alignment with the pins 4, but to maintain it positively in this position when desired, I provide stops or levers 7 secured upon a rock shaft 70 extending from one of the standards 66 to the other and slightly to one side of the vertical plane through the axis of the pinion. A socketed handle 71 for the reception of a bar or like member is also secured on the shaft 70, by which means it may be rocked to bring the levers 7 into position to contact with lugs 68 carried by the journal blocks 65, or to throw them down into inoperative position, whereby the springs 67 may have free play. By this arrangement, when it is desired to dump the load, the rock shaft 70 is oscillated to bring the levers 7 into contact with the lugs 68, and sufficient force may be applied through a bar secured in the socketed handle 71 to raise the blocks slightly, if this is found necessary. Once brought into this position by reason of the off-center location of the shaft 70 and the engagement of the handle 71 with the cross piece 60, the tendency of the load is to maintain parts in this position. Hence, the drum 2 may now be tilted into dumping position, without the danger of depressing the worm pinion 6 from its proper location in axial alignment with the pins 4.

Throughout the course of this specification, I have described a worm pinion as the transverse power transmission means, because it represents an extreme case, in that maximum forces act thereon at times because of the tilting of the load. It must be kept in mind, however, that my invention applies equally to the various types of drives disclosed in my prior patent, and will be found equally valuable to give the desired flexibility to the rear end of the chassis and subframe when bevel or spur gear or chain drives, as shown in that patent, are employed.

What I claim as my invention is:

1. The combination with an automobile truck chassis and a subframe pivotally mounted thereon, a rotative mixer element mounted on said subframe, and drive means connecting said mixer element with the truck's power plant, including an element journaled coaxially with the pivot of said subframe, but independent thereof.

2. The combination with an automobile truck chassis and a subframe pivotally mounted thereon, a rotative mixer element mounted on said subframe, a shaft supported on the chassis and extending from the truck power plant substantially to the pivot axis of said subframe, and an operative connection between said shaft and said rotative mixer element including a member coaxial with but supported independently of the pivot of said subframe.

3. In combination with an automobile truck chassis and a subframe, a rotative mixer element mounted on the subframe, spaced means pivotally connecting the chassis and subframe, a transverse shaft lying between said pivot means, and generally coaxial therewith but independent thereof, and means operatively connecting said shaft with the mixer element to drive it, and with the truck power plant to be driven.

4. In combination with an automobile truck chassis and a subframe, a rotative mixer element mounted on the subframe, spaced means pivotally connecting the chassis and subframe, a transverse shaft lying between said pivot means, and generally coaxial therewith but independent thereof, journals for said shaft carried upon said chassis, and means operatively connecting said shaft with the mixer element to drive it, and with the truck power plant to be driven.

5. In combination with an automobile truck chassis and a subframe, a rotative mixer element mounted on the subframe, spaced means pivotally connecting the chassis and subframe, a transverse shaft lying between said pivot means, and generally coaxial therewith but independent thereof, journal means for said shaft yieldable under load stresses, but generally maintaining said shaft substantially coaxial with the pivot means, and means operatively connecting said shaft with the mixer element to drive it, and with the truck power plant to be driven.

6. In combination with an automobile truck chassis and a subframe, a rotative mixer element mounted on the subframe, spaced means pivotally connecting the chassis and subframe, a transverse shaft lying between said pivot means, and generally coaxial therewith but independent thereof, journal means for said shaft vertically yieldable under load stresses, but generally maintaining said shaft substantially coaxial with the pivot means, means operable at will for positioning said shaft exactly coaxial with the pivot means, and means operatively connecting said shaft with the mixer element to drive it, and with the truck power plant to be driven.

7. In combination with an automobile truck chassis and a subframe, a pair of pivot brackets at the sides of the chassis and subframe pivotally connecting the same, a rotative mixer element mounted on the subframe, journal bearings interposed between the pair of pivot brackets, and axially aligned therewith, a transverse shaft journaled in said bearings, a longitudinal shaft carried upon the chassis, and operatively connected to a source of power on the chassis, drive means connecting said longitudinal and transverse shafts, and means operatively connecting said transverse shaft with said rotative mixer element.

8. The combination with a road vehicle having a source of power mounted thereon, a subframe pivoted by its rear end upon the vehicle chassis, a mixer including a rotary mixer drum cradled upon said subframe, a rotary member coaxial with but wholly independent of the pivot of said subframe, means operatively connecting said rotary member with the power source, and power transmission means operatively connecting said rotary member with said mixer drum.

9. The combination with a road vehicle having a source of power mounted on its chassis, a subframe pivotally mounted upon said chassis, a movable mixer element supported upon said subframe, a rotary member journaled coaxially with but wholly independently of the pivot means for said subframe, and power transmission means operatively connecting said power source to the mixer element, to operate the latter, through said rotary member.

10. In a concrete mixer, in combination with an automobile truck chassis and propelling mechanism, a subframe, aligned pivot pins at opposite sides of the chassis and subframe for pivotally securing the subframe on the chassis, a mixer element revolubly cradled upon said subframe, and power transmission means operatively connecting the propelling mechanism on the chassis with the mixer element on the subframe through the pivot axis of the subframe, but by means lying between the inner ends of said pivot pins, and independent thereof.

Signed at Seattle, King County, Washington, this 10th day of August, 1927.

CHARLES L. REYNOLDS.